(12) United States Patent
Xiao

(10) Patent No.: US 11,402,681 B2
(45) Date of Patent: Aug. 2, 2022

(54) ENCAPSULATION STRUCTURE AND DISPLAY DEVICE

(71) Applicant: Wuhan China Star Optoelectronics Technology Co., Ltd., Wuhan (CN)

(72) Inventor: Shiyuan Xiao, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 230 days.

(21) Appl. No.: 16/753,057

(22) PCT Filed: Oct. 29, 2019

(86) PCT No.: PCT/CN2019/113928
§ 371 (c)(1),
(2) Date: Apr. 2, 2020

(87) PCT Pub. No.: WO2021/027073
PCT Pub. Date: Feb. 18, 2021

(65) Prior Publication Data
US 2022/0004048 A1  Jan. 6, 2022

(30) Foreign Application Priority Data

Aug. 15, 2019  (CN) .......................... 201910752633.0

(51) Int. Cl.
*G02F 1/1333* (2006.01)

(52) U.S. Cl.
CPC .. *G02F 1/133322* (2021.01); *G02F 1/133314* (2021.01); *G02F 1/133317* (2021.01); *G02F 2201/46* (2013.01)

(58) Field of Classification Search
CPC .................................................. G02F 1/133322
See application file for complete search history.

(56) References Cited

U.S. PATENT DOCUMENTS 11,092,737 B2 *  8/2021  Zhao ................. G02F 1/133615

* cited by examiner

*Primary Examiner* — Vip Patel

(57) ABSTRACT

The present invention provides an encapsulation structure and a display device, the encapsulation structure includes a frame, a sidewall edge of the frame is provided with at least one first buckle along a sidewall direction of the frame; and a bracket, a sidewall of the bracket is protruded from an inner surface thereof to provide at least one second buckle, wherein when the frame is inserted into the bracket, the first buckle engages with the second buckle corresponding to the first buckle.

12 Claims, 4 Drawing Sheets

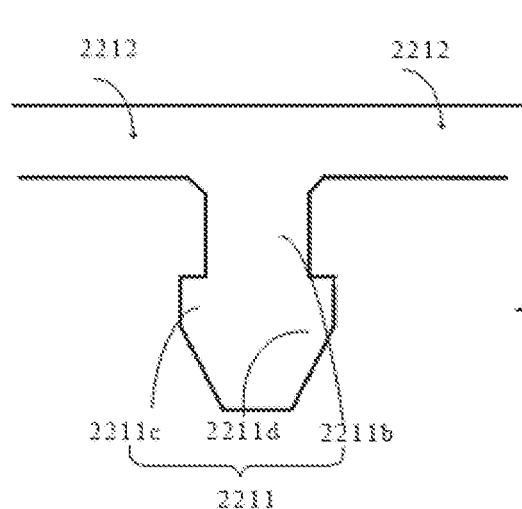
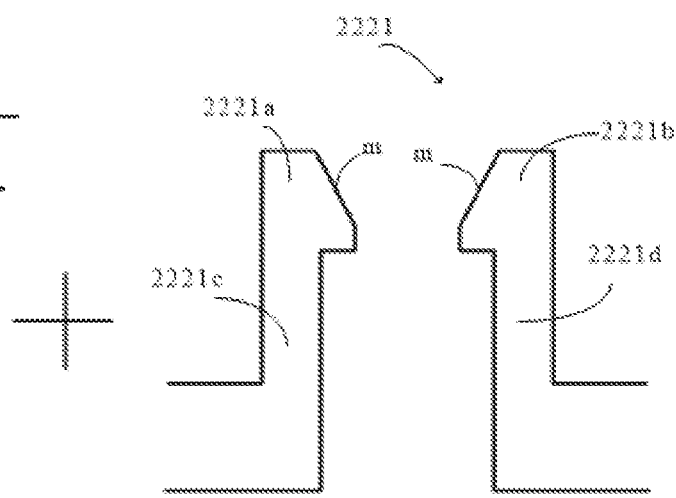
FIG. 5a  FIG. 5b
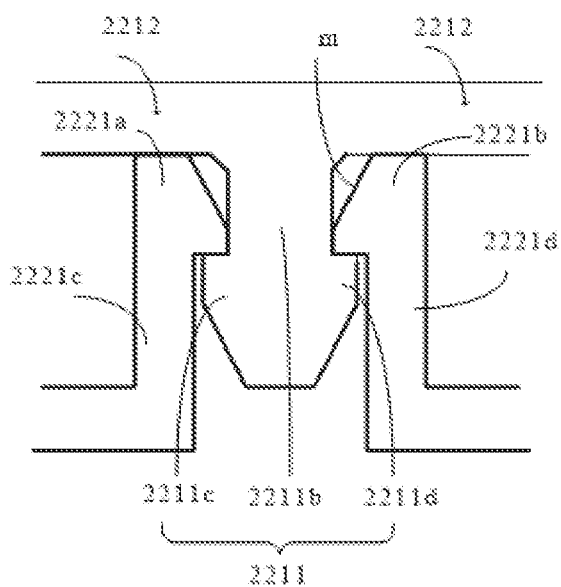
FIG. 5c

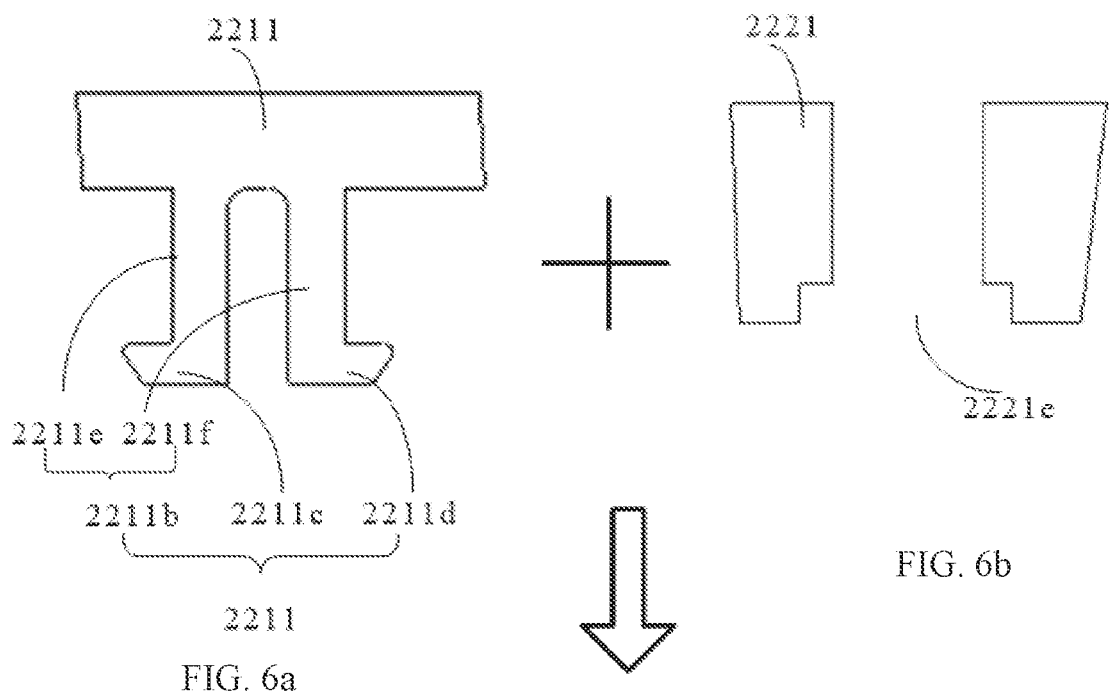
FIG. 6a
FIG. 6b
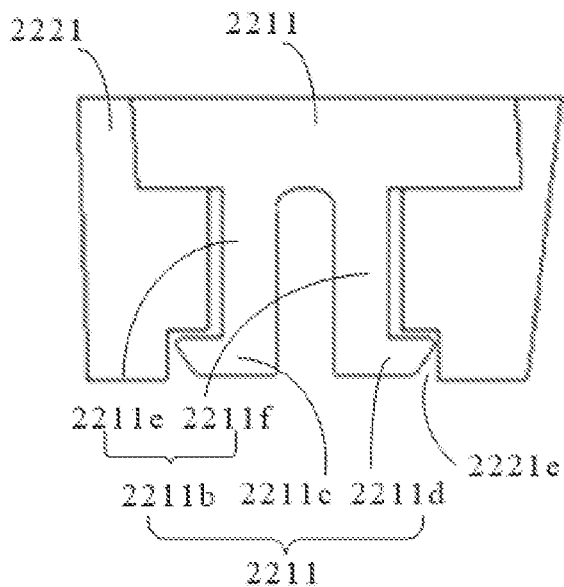
FIG. 6c

United States Patent US 11,402,681 B2

ENCAPSULATION STRUCTURE AND DISPLAY DEVICE

RELATED APPLICATIONS

This application is a National Phase of PCT Patent Application No. PCT/CN2019/113928 having International filing date of Oct. 29, 2019, which claims the benefit of priority of Chinese Patent Application No. 201910752633.0 filed on Aug. 15, 2019. The contents of the above applications are all incorporated by reference as if fully set forth herein in their entirety.

FIELD AND BACKGROUND OF THE INVENTION

The invention relates to a field of display technology, and more particularly to an encapsulation structure and a display device.

As intelligent mobile terminals are getting more and more popular, display panel technology has been widely used. For example, the display panel technology has been used in the field of automobile technology to realize display screens in vehicles.

As shown in FIG. 1, a display device 1 includes components such as a display panel 11, an optical film layer 12, a light guide plate (LGP) 13, a reflector plate 14, a frame 15, and a bracket 16. The frame 15 is provided with a hook 151, and the bracket 16 is provided with a slot matching with the hook 151. The display device 1 is fixed on an automobile through the hook 151 and the slot 161.

However, for present display device 1, it is necessary to reserve the slot 161 on the bracket 16 to fix the hook 151. That is, the bracket 16 is required to have a large thickness, resulting in large borders of the display device.

An object of the present invention is to provide an encapsulation structure and a display device, which can reduce a width of borders of the display device.

SUMMARY OF THE INVENTION

An embodiment of the present invention provides an encapsulation structure, comprising:

a frame, a sidewall edge of the frame provided with at least one first buckle along a sidewall direction of the frame; and a bracket, a sidewall of the bracket protruded from an inner surface thereof to provide at least one second buckle, wherein when the frame is inserted into the bracket, the first buckle engages with the second buckle corresponding to the first buckle.

In one embodiment, the first buckle comprises:

a first connector disposed along the sidewall direction of the frame and located on the same plane as the sidewall of the frame; and a first protruding platform and a second protruding platform disposed at two sides of one end of the first connector, respectively, wherein the other end of the first connector connects with the sidewall edge of the frame.

In one embodiment, both of a protruding orientation of the first protruding platform and a protruding orientation of the second protruding platform are arranged along a direction parallel to the sidewall of the frame.

In one embodiment, the second buckle comprises:

a second connector and a third connector protruded from the inner surface of the sidewall of the bracket;

a first protrusion disposed on the second connector; and a second protrusion disposed on the third connector, wherein the second connector is disposed opposite to the third connector, and the first protrusion is disposed opposite to the second protrusion;

wherein the first protrusion, the second protrusion, the second connector, and the third connector jointly form a slot which is configured to receive the first buckle.

In one embodiment, each of the first protruding platform and the second protruding platform is provided with a guiding cant used for insertion and alignment of the first protruding platform and the second protruding platform of the first buckle.

In one embodiment, the first connector comprises:

a first sub-connector having elasticity; and a second sub-connector having elasticity, wherein the first protruding platform is disposed at one end of the first sub-connector, and the second protruding platform is disposed at one end of the second sub-connector;

wherein the other end of the first sub-connector and the other end of the second sub-connector connect with the sidewall edge of the frame.

In one embodiment, the first connector further comprises:

a guiding component disposed between the first sub-connector and the second sub-connector, wherein one end of the guiding component connects with the sidewall edge of the frame.

In one embodiment, a material of each of the first buckle and the second buckle comprises a polymer material or a metal material.

In one embodiment, the polymer material comprises at least one of acryl, polycarbonate, and acrylonitrile-butadiene-styrene plastic.

In one embodiment, the metal material comprises aluminum alloy and/or magnesium alloy.

The embodiment of the present invention further provides a display device, comprising a backlight module, a display panel, and an encapsulation structure, wherein the encapsulation structure comprises:

a frame, configured to carry the display panel, a sidewall edge of the frame provided with at least one first buckle along a sidewall direction of the frame; and a bracket, configured to carry the backlight module, a sidewall edge of the bracket protruded from an inner surface thereof to provide at least one second buckle, wherein when the frame is inserted into the bracket, the first buckle engages with the second buckle corresponding to the first buckle, so that the backlight module is disposed opposite to the display panel, and the backlight module is disposed between the bracket and the frame.

In one embodiment, the first buckle comprises:

a first connector disposed along the sidewall direction of the frame and located on the same plane as the sidewall of the frame; and a first protruding platform and a second protruding platform disposed at two sides of one end of the first connector, respectively, wherein the other end of the first connector connects with the sidewall edge of the frame.

In one embodiment, both of a protruding orientation of the first protruding platform and a protruding orientation of the second protruding platform are arranged along a direction parallel to the sidewall of the frame.

In one embodiment, the second buckle comprises:

a second connector and a third connector protruded from the inner surface of the sidewall of the bracket;

a first protrusion disposed on the second connector; and a second protrusion disposed on the third connector, wherein the second connector is disposed opposite to the third connector, and the first protrusion is disposed opposite to the second protrusion;

wherein the first protrusion, the second protrusion, the second connector, and the third connector jointly form a slot which is configured to receive the first buckle.

In one embodiment, each of the first protruding platform and the second protruding platform is provided with a guiding cant used for insertion and alignment of the first protruding platform and the second protruding platform of the first buckle.

In one embodiment, the first connector comprises:

a first sub-connector having elasticity; and a second sub-connector having elasticity, wherein the first protruding platform is disposed at one end of the first sub-connector, and the second protruding platform is disposed at one end of the second sub-connector;

wherein the other end of the first sub-connector and the other end of the second sub-connector connect with the sidewall edge of the frame.

In one embodiment, the first connector further comprises:

a guiding component disposed between the first sub-connector and the second sub-connector, wherein one end of the guiding component connects with the sidewall edge of the frame.

In one embodiment, a material of each of the first buckle and the second buckle comprises a polymer material or a metal material.

In one embodiment, the polymer material comprises at least one of acryl, polycarbonate, and acrylonitrile-butadiene-styrene plastic.

In one embodiment, the metal material comprises aluminum alloy and/or magnesium alloy.

The beneficial effect is that the encapsulation structure and the display device of the present invention make the first buckle engages with the second buckles by providing with the first buckle at the sidewall edge of the frame along the sidewall direction of the frame and providing the second buckle protruded from the inner surface of the sidewall of the bracket when the frame is inserted into the bracket, thereby reducing a thickness of the bracket and a width of borders of the display device.

BRIEF DESCRIPTION OF THE SEVERAL VIEWS OF THE DRAWINGS

In order to make the above content of the present invention more obvious and understandable, the preferred embodiments are described below in detail with the accompanying drawings:

FIGS. 5a, 5b and 5c are schematic diagrams showing an engagement of a first buckle and a second buckle according to the embodiment of the present invention.

FIGS. 6a, 6b and 6c are schematic diagrams showing another engagement of the first buckle and a second buckle according to the embodiment of the present invention.

DESCRIPTION OF SPECIFIC EMBODIMENTS OF THE INVENTION

The following descriptions for the respective embodiments are specific embodiments capable of being implemented for illustrating the present disclosure with referring to the appending figures. In describing the present disclosure, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present disclosure for ease of understanding, but are not intended to limit the present disclosure. In the appending figures, units with similar structures are indicated by same reference numbers.

Figure 1:
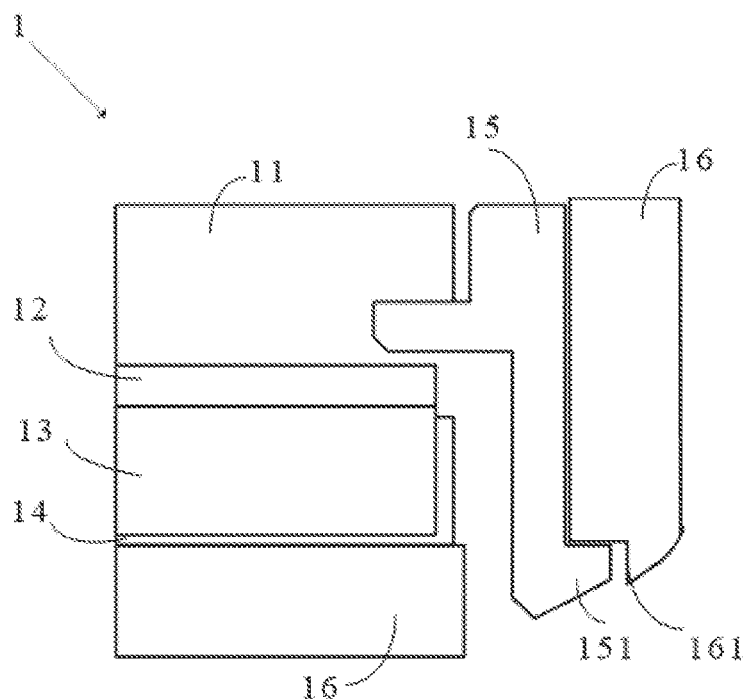
FIG. 1 is a schematic structural diagram showing an existing display device.
Figure 2:
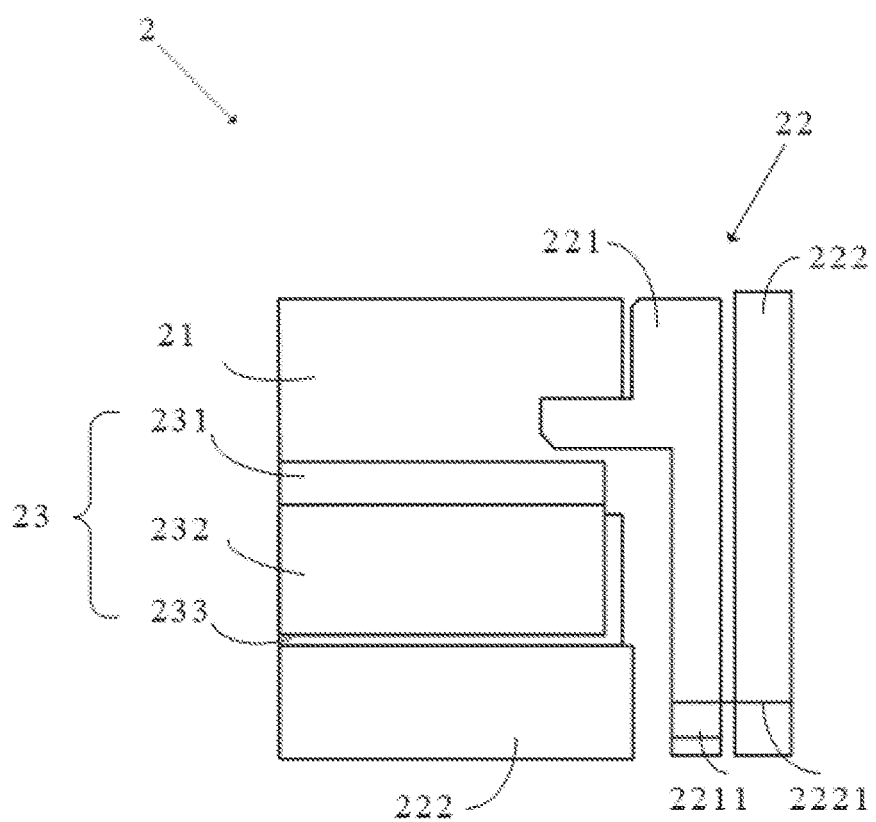
FIG. 2 is a schematic structural diagram showing a display device according to the embodiment of the present invention.

The "embodiment" mentioned in the content means that a particular feature, a structure, or a characteristic in conjunction with the description of the embodiments may be included in at least one embodiment of the present invention. The phrases appearing in various paragraphs in the specification are not necessarily referring to the same embodiment, and are not the embodiments that are mutually exclusive, independent, or alternative with other embodiments. Persons skilled in this art can explicitly or implicitly understand that the embodiments described herein may be combined with other embodiments The embodiment of the present invention provides a display device. FIG. 2 is a schematic structural diagram showing the display device according to the embodiment of the present invention. The display device 2 includes a display panel 21, backlight module 23, and an encapsulation structure 22.

The display panel 21 may be a liquid display panel, or may be an organic electroluminescent display panel, a specific type of the display panel 21 is not specifically limited herein. As shown in FIG. 2, the backlight module 23 includes optical film layer 231, a light guide plate (LGP) 232, and a reflector plate 233. The LGP 232 includes a light-incident surface and a light-exit surface. Light rays enter through the light-incident surface of the LGP 232, and are diffused and reflected by printed dots inside the LGP 232, a part of light rays is emitted out from the light-exit surface, so that light rays are emitted to a surface. The optical film layer 231 may include a multi-optical film layer such as a diffuser or a prism. The diffuser is used to diffuse light rays, the prism is used to increase the brightness of light rays, and the reflector plate 233 is used to reflect light rays.

As shown in FIG. 2, the encapsulation structure 22 includes a frame 221 and a bracket 222, wherein the frame 221 is configured to carry the display panel 21, and the bracket is configured to carry the backlight module 23.

Figure 3:
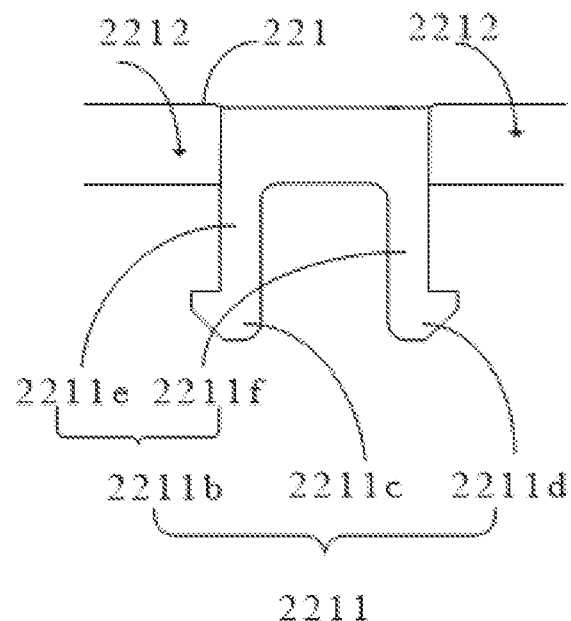
FIG. 3 is a schematic structural diagram showing a first buckle according to the embodiment of the present invention.

As shown in FIG. 3, a sidewall 2212 edge of the frame 221 is provided with at least one first buckle 2211 along a sidewall direction of the frame 221. The first buckle 2211 may be integrally formed with the frame 221, or may be fixed on the sidewall 2212 of the frame 221 by using a colloid or a screw matching with a nut. A material of the first buckle 2211 includes a polymer material or a metal material, wherein the first buckle 2211 which is made of the polymer material has advantages of high strength and good flexibility. In one embodiment, the polymer material may include at least one of acryl, polycarbonate, and acrylonitrile-butadiene-styrene plastic. In one embodiment, the metal material includes aluminum alloy and/or magnesium alloy, wherein the first buckle 2211 which is made of the aluminum alloy and/or magnesium alloy has advantages of light weight, high strength, and large modulus of elasticity.

As shown in FIG. 3 to FIG. 6, the first buckle 2211 includes a first connector 2211b, a first protruding platform 2211c and a second protruding platform 2211d, wherein the first connector 2211b is disposed along the sidewall 2212 direction of the frame 221 and located on the same plane as the sidewall 2212 of the frame 221. The first protruding platform 2211c and the second protruding platform 2211d is disposed at two sides of one end of the first connector 2211b, respectively, and the other end of the first connector 2211b connects with the sidewall 2212 edge of the frame 221. Both of a protruding orientation of the first protruding platform 2211c and a protruding orientation of the second protruding platform 2211d are arranged along a direction parallel to the sidewall 2212 of the frame 221. The protruding orientation of the first protruding platform 2211c and the second protruding platform 2211d may be the same or opposite.

Figure 4:
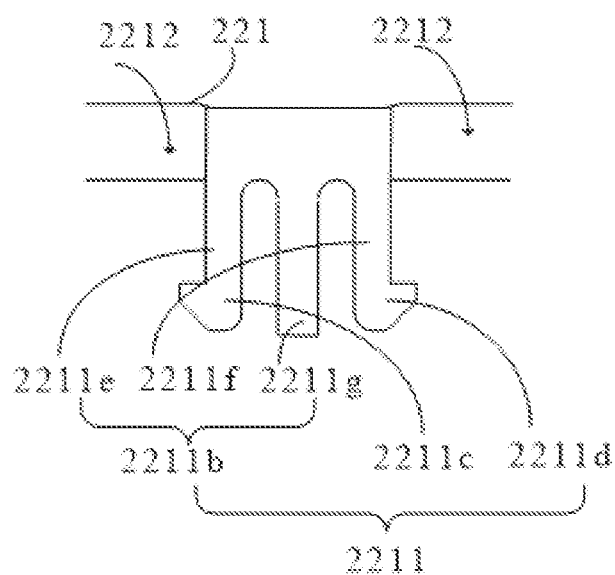
FIG. 4 is a schematic structural diagram showing another first buckle according to the embodiment of the present invention.

The first connector 2211b is composed of at least one sub-connector. As shown in FIG. 5, the first connector 2211b has only one sub-connector. As shown in FIG. 3 or FIG. 6, the first connector 2211b includes two sub-connectors. As shown in FIG. 4, the first connector 2211b not only includes two sub-connectors, but also further includes a guiding component.

In one embodiment, as shown in FIG. 3, 4 or 6, the first connector 2211b includes a first sub-connector 2211e having elasticity and a second sub-connector 2211f having elasticity, wherein the first protruding platform 2211c is disposed at one end of the first sub-connector 2211e, the second protruding platform 2211d is disposed at one end of the second sub-connector 2211f, the other end of the first sub-connector 2211e and the other end of the second sub-connector 2211f connect with the sidewall 2212 edge of the frame 221. The first sub-connector 2211e is disposed opposite to the second sub-connector 2211f. In one embodiment, the first sub-connector 2211e and the second sub-connector 2211f are disposed in parallel with each other.

In one embodiment, as shown in FIG. 4, the first connector 2211b further includes a guiding component 2211g disposed between the first sub-connector 2211e and the second sub-connector 2211f, one end of the guiding component 2211 connects with the sidewall 2212 edge of the frame 221. In one embodiment, the guiding component 2211g, the first sub-connector 2211e and the second sub-connector 2211f are disposed in parallel with each other, wherein the guiding component 2211g may assist the first buckle 2211 to fast-fasten.

A sidewall of the bracket 222 is protruded from an inner surface thereof to provide at least one second buckle 2221. Specifically, the second buckle 2221 protrudes from the bracket 222 toward a direction of the first buckle 2211. The second buckle 2221 and the first buckle 2211 match each other. The second buckle 2221 and the first buckle 2211 match each other through the engagement of the second buckle 2221 and the first buckle 2211 on the sidewall 2212 of the frame 221. It may make the frame 221 inserts into the bracket 222.

The second buckle 2221 may be integrally formed with the bracket 222, or may be fixed on the bracket 222 by using a colloid or a screw matching with a nut. A material of the second buckle 2221 includes a polymer material or a metal material, wherein the second buckle 2221 which is made of the polymer material has advantages of high strength and good flexibility. The polymer material may include at least one of acryl, polycarbonate, and acrylonitrile-butadiene-styrene plastic. In one embodiment, the metal material includes aluminum alloy and/or magnesium alloy, wherein the second buckle 2211 which is made of the aluminum alloy and/or magnesium alloy has advantages of light weight, high strength, and large elasticity modulus.

In one embodiment, as shown in FIG. 5, the second connector 2221 includes a first protrusion 2221a, a second protrusion 2221b, a second connector 2221c, and a third connector 2221d. A sidewall of the bracket 222 is protruded from an inner surface thereof to provide the second connector 2221c and the third connector 2221d. The first protrusion 2221a is disposed on the second connector 2221c, and the second protrusion 2221b is disposed on the third connector 2221d. The second connector 2221c is disposed opposite to the third connector 2221d, and the first protrusion 2221a is disposed opposite to the second protrusion 2221b. The first protrusion 2221a, the second protrusion 2221b, the second connector 2221c, and the third connector 2221d jointly form a slot which is configured to receive the first buckle 2211.

Further, the first protrusion 2221a matches the first protruding platform 2211c, a protruding orientation of the first protrusion 2221a is opposite to the protruding orientation of the first protruding platform 2211c. The first protrusion 2221a is configured to engage with the first protruding platform 2211c to lock the first protruding platform 2211c. The second protrusion 2221b matches the second protruding platform 2211d, a protruding orientation of the second protrusion 2221b is opposite to the protruding orientation of the second protruding platform 2211d. The second protrusion 2221b is configured to engage with the second protruding platform 2211d to lock the second protruding platform 2211d.

In one embodiment, the first protrusion 2221a has elasticity, the first protrusion 2221a is in a non-deformed state when it is not subjected to an external force. In a process of inserting the first buckle 2211 into the second buckle 2221, the first protrusion 2221a is in deformation state when it is squeezed by the first protruding platform 2211c. After the first protruding platform 2211c inserts into the slot, the first protrusion 2221a returns to the non-deformed state.

The second protrusion 2221b has elasticity, the second protrusion 2221b is in a non-deformed state when it is not subjected to an external force. In a process of inserting the first buckle 2211 into the second buckle 2221, the second protrusion 2221b is in deformation state when it is squeezed by the second protruding platform 2211d. After the second protruding platform 2111d inserts into the slot, the second protrusion 2221b returns to the non-deformed state.

Specifically, in the process of inserting the first buckle 2211 into the second buckle 2221, the first protrusion 2221a and the second protrusion 2221b expand in a direction away from each other.

In one embodiment, each of the first protrusion 2221a and the second protrusion 2221b is provided with a guiding cant m used for insertion and alignment of the first protruding platform 2211c and the second protruding platform 2211d of the first buckle 2211.

In one embodiment, the second buckle 2221 includes a groove 2221e. The groove 2221e is configured to receive the first protruding platform 2211c and the second protruding platform 2211d and lock the first protruding platform 2211c and the second protruding platform 2211d.

The first sub-connector 2211e has elasticity, the second connector 2211e is in a non-deformed state when it is not subjected to an external force. In a process of inserting the first buckle 2211 into the second buckle 2221, the first sub-connector 2211e is in deformation state after the first protruding platform 2211c is squeezed by the inner sidewall of the second buckle 2221. After the first buckle 2211 inserts into the second buckle 2221, the first sub-connector 2211e returns to the non-deformed state.

The second sub-connector 2211f has elasticity, the second sub-connector 2211f is in a non-deformed state when it is not subjected to an external force. In a process of inserting the first buckle 2211 into the second buckle 2221, the second sub-connector 2211f is in deformation state after the second protruding platform 2211d is squeezed by the inner sidewall of the second buckle 2221. After the first buckle 2211 inserts into the second buckle 2221, the second sub-connector 2211f returns to the non-deformed state.

Specifically, in the process of inserting the first buckle 2211 into the second buckle 2221, the first protruding platform 2211c and the second protruding platform 2211d are squeezed by the inner sidewall of the second buckle 2221, so that the first sub-connector 2211e and the second sub-connector 2211f contract in a direction toward each other.

When the frame 221 is inserted into the bracket 222, the first buckle 2211 engages with the second buckle 2221 corresponding to the first buckle, so that the backlight module 23 is disposed opposite to the display panel 21, and the backlight module 23 is disposed between the bracket 222 and the frame 221.

The embodiment of the present invention provides the encapsulation structure and the display device. By providing with the first buckle at the sidewall edge of the frame along the sidewall direction of the frame and providing the second buckle protruded from the inner surface of the sidewall of the bracket, so that the first buckle engages with the second buckle corresponding to the first buckle when the frame is inserted into the bracket, thereby reducing a thickness of the bracket and a width of borders of the display device.

Above all, although the present invention has been disclosed above in the preferred embodiments, the above preferred embodiments are not intended to limit the present invention. For persons skilled in this art, various modifications and alterations can be made without departing from the spirit and scope of the present invention. The protective scope of the present invention is subject to the scope as defined in the claims.

What is claimed is:

1. An encapsulation structure, comprising:
a frame, a sidewall edge of the frame provided with at least one first buckle along a sidewall direction of the frame; and
a bracket, a sidewall of the bracket protruded from an inner surface thereof to provide at least one second buckle,
wherein when the frame is inserted into the bracket, the first buckle engages with the second buckle corresponding to the first buckle,
wherein the first buckle comprises:
a first connector disposed along the sidewall direction of the frame and located on the same plane as the sidewall of the frame; and
a first protruding platform and a second protruding platform disposed at two sides of one end of the first connector, respectively,
wherein the other end of the first connector connects with the sidewall edge of the frame,
wherein both of a protruding orientation of the first protruding platform and a protruding orientation of the second protruding platform are arranged along a direction parallel to the sidewall of the frame,
wherein the second buckle comprises:
a second connector and a third connector protruded from the inner surface of the sidewall of the bracket;
a first protrusion disposed on the second connector; and
a second protrusion disposed on the third connector,
wherein the second connector is disposed opposite to the third connector, and the first protrusion is disposed opposite to the second protrusion;
wherein the first protrusion, the second protrusion, the second connector, and the third connector jointly form a slot which is configured to receive the first buckle,
wherein each of the first protruding platform and the second protruding platform is provided with a guiding cant used for insertion and alignment of the first protruding platform and the second protruding platform of the first buckle.

2. The encapsulation structure as claimed in claim 1, wherein the first connector comprises:
a first sub-connector having elasticity; and
a second sub-connector having elasticity,
wherein the first protruding platform is disposed at one end of the first sub-connector, and the second protruding platform is disposed at one end of the second sub-connector;
wherein the other end of the first sub-connector and the other end of the second sub-connector connect with the sidewall edge of the frame.

3. The encapsulation structure as claimed in claim 2, wherein the first connector further comprises:
a guiding component disposed between the first sub-connector and the second sub-connector,
wherein one end of the guiding component connects with the sidewall edge of the frame.

4. The encapsulation structure as claimed in claim 1, wherein a material of each of the first buckle and the second buckle comprises a polymer material or a metal material.

5. The encapsulation structure as claimed in claim 4, wherein the polymer material comprises at least one of acryl, polycarbonate, and acrylonitrile-butadiene-styrene plastic.

6. The encapsulation structure as claimed in claim 4, wherein the metal material comprises aluminum alloy or magnesium alloy.

7. A display device, comprising a backlight module, a display panel, and an encapsulation structure, wherein the encapsulation structure comprises:
a frame, configured to carry the display panel, a sidewall edge of the frame provided with at least one first buckle along a sidewall direction of the frame; and
a bracket, configured to carry the backlight module, a sidewall edge of the bracket protruded from an inner surface thereof to provide at least one second buckle,
wherein when the frame is inserted into the bracket, the first buckle engages with the second buckle corresponding to the first buckle, so that the backlight module is disposed opposite to the display panel, and the backlight module is disposed between the bracket and the frame,
wherein the first buckle comprises:
a first connector disposed along the sidewall direction of the frame and located on the same plane as the sidewall of the frame; and
a first protruding platform and a second protruding platform disposed at two sides of one end of the first connector, respectively, wherein the other end of the first connector connects with the sidewall edge of the frame, wherein both of a protruding orientation of the first protruding platform and a protruding orientation of the second protruding platform are arranged along a direction parallel to the sidewall of the frame, wherein the second buckle comprises:

a second connector and a third connector protruded from the inner surface of the sidewall of the bracket;

a first protrusion disposed on the second connector; and a second protrusion disposed on the third connector, wherein the second connector is disposed opposite to the third connector, and the first protrusion is disposed opposite to the second protrusion;

wherein the first protrusion, the second protrusion, the second connector, and the third connector jointly form a slot which is configured to receive the first buckle, wherein each of the first protruding platform and the second protruding platform is provided with a guiding cant used for insertion and alignment of the first protruding platform and the second protruding platform of the first buckle.

8. The display panel as claimed in claim 7, wherein the first connector comprises:

a first sub-connector with elasticity; and a second sub-connector with elasticity, wherein the first protruding platform is disposed at one end of the first sub-connector, and the second protruding platform is disposed at one end of the second sub-connector;

wherein the other end of the first sub-connector and the other end of the second sub-connector connect with the sidewall edge of the frame.

9. The display panel as claimed in claim 8, wherein the first connector further comprises:

a guiding component disposed between the first sub-connector and the second sub-connector, wherein one end of the guiding component connects with the sidewall edge of the frame.

10. The display panel as claimed in claim 7, wherein a material of each of the first buckle and the second buckle comprises a polymer material or a metal material.

11. The display panel as claimed in claim 10, wherein the polymer material comprises at least one of acryl, polycarbonate, and acrylonitrile-butadiene-styrene plastic.

12. The display panel as claimed in claim 10, wherein the metal material comprises aluminum alloy or magnesium alloy.

\* \* \* \* \*